United States Patent Office 3,195,372
Patented July 20, 1965

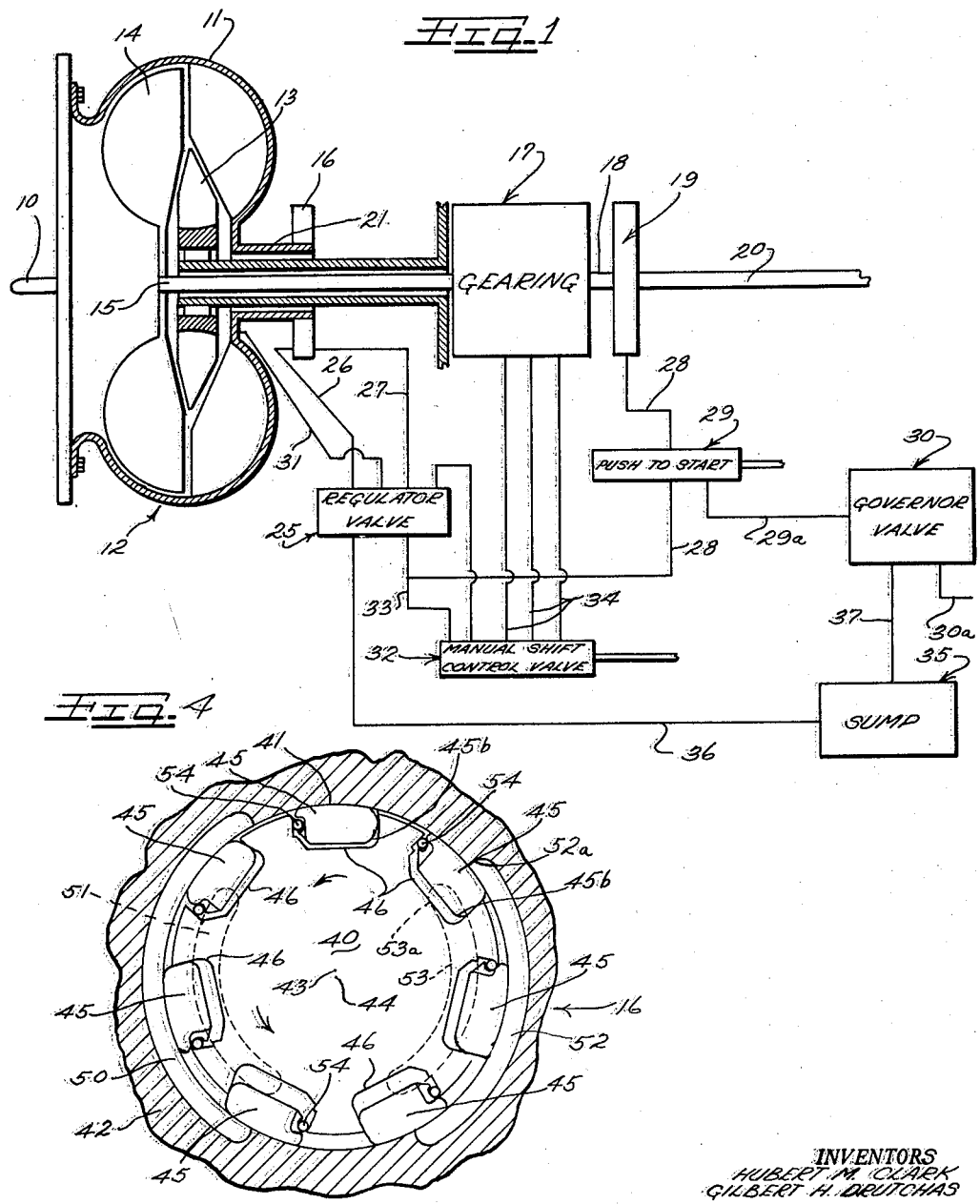

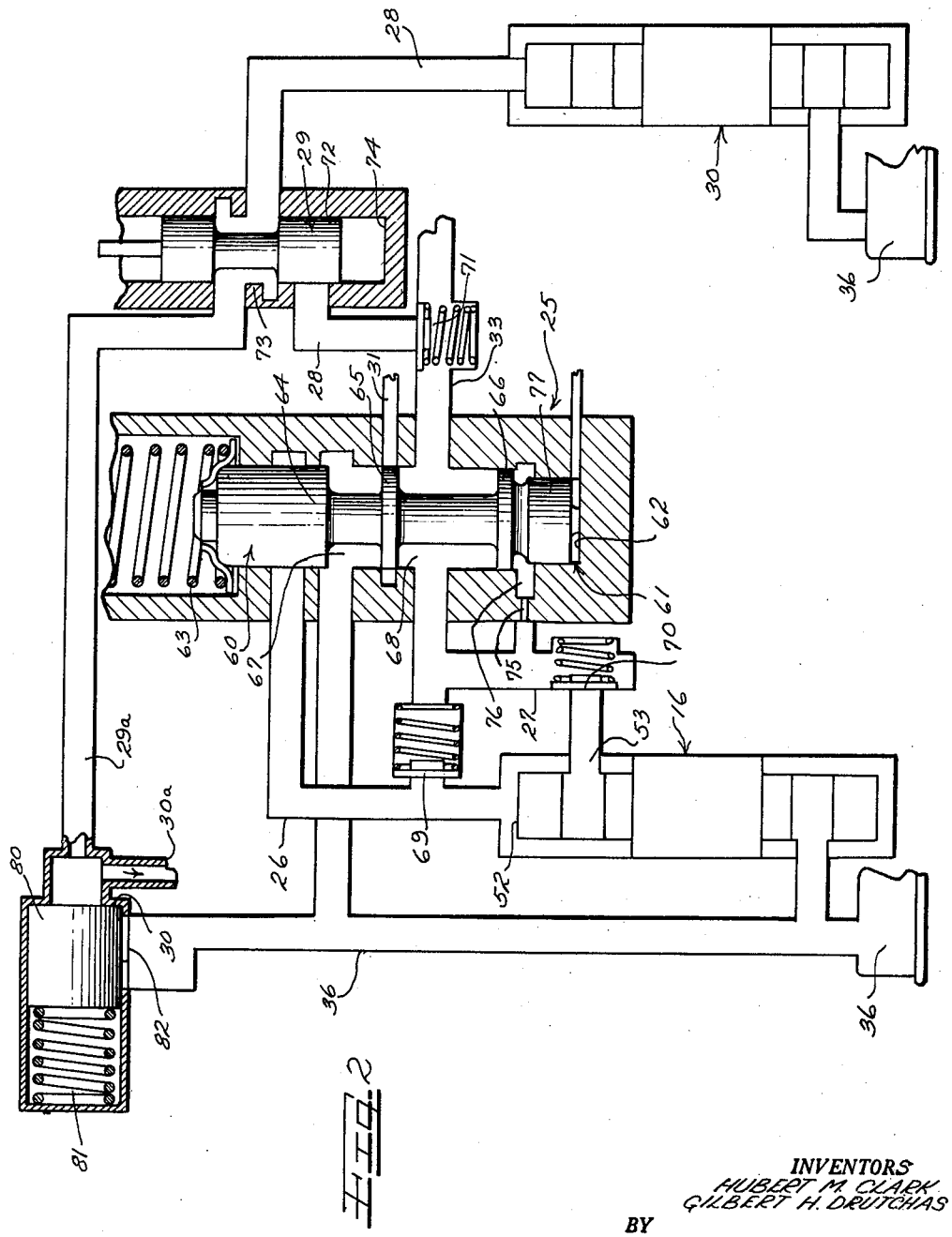

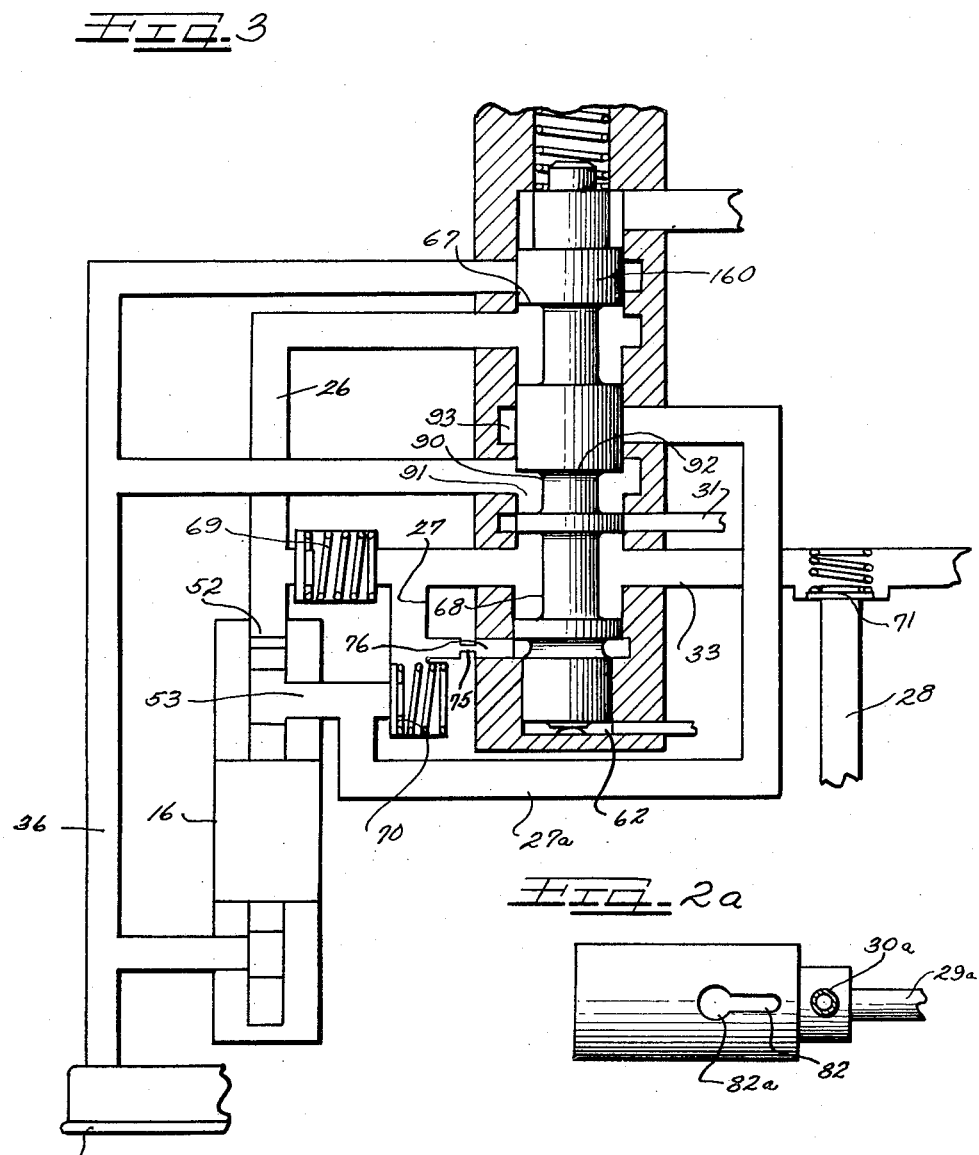

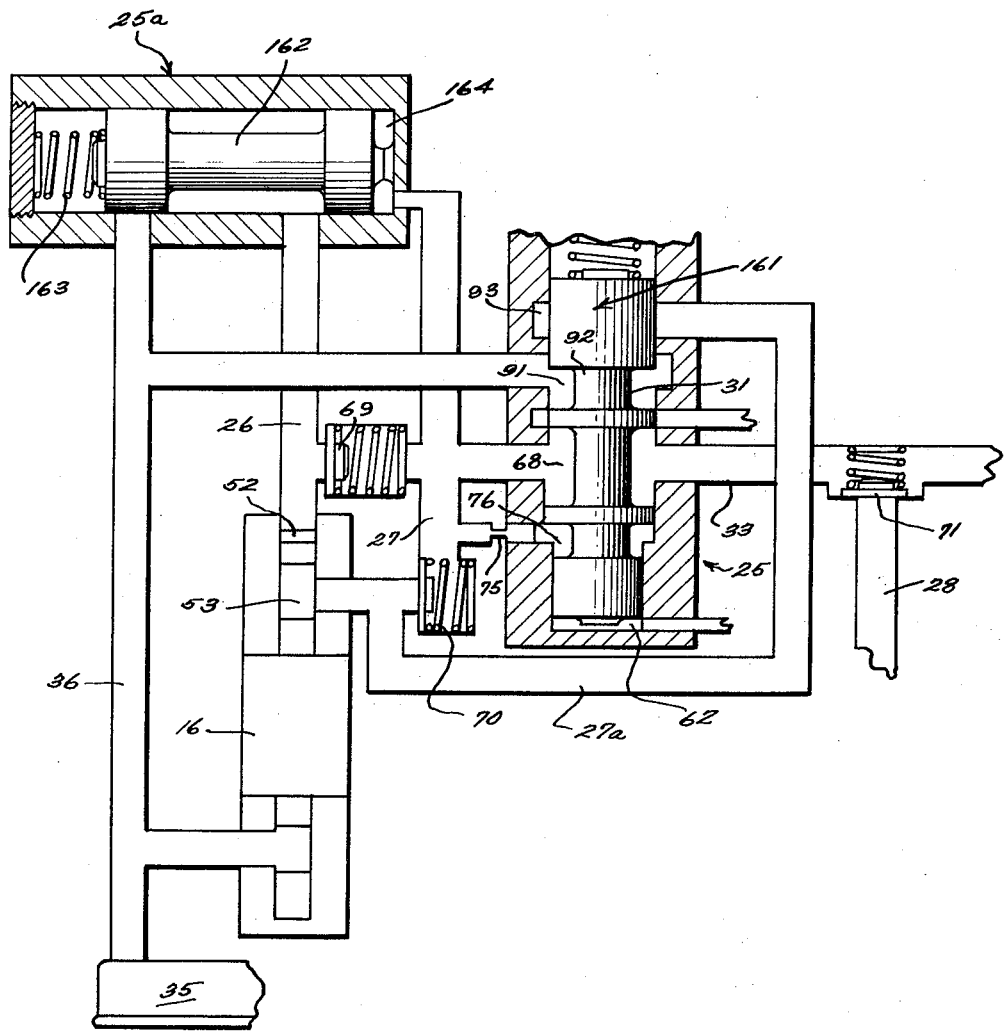

3,195,372
AUTOMOTIVE TRANSMISSION
Hubert M. Clark, Bloomfield Township, and Gilbert H. Drutchas, Detroit, Mich., assignors to Thompson Ramo Wooldridge Inc., Warren, Mich., a corporation of Ohio
Filed July 7, 1961, Ser. No. 122,516
3 Claims. (Cl. 74—730)

The present invention relates to hydraulically controlled transmissions. More particularly, the invention relates to transmissions commonly employed in automotive vehicles, though not limited thereto, and which incorporate a plurality of hydraulic liquid pumps for providing and maintaining various liquid pressure levels in the transmission system.

As those skilled in the transmission art are aware, modern day automotive transmissions of the automatic type almost universally employ hydraulic control systems coupled with an hydraulic torque converter, or in some cases a fluid coupling of the Fottinger type combined with reduction gearing. The nature of automotive vehicles is such that the transmissions thereof are operated over an extremely wide range of speed and load conditions and, accordingly, sources of liquid pressure built into such transmissions and operated by the rotating shafts therein, similarly operate over a wide range of speeds. As a result of such speed variations, pumps employed in such variable speed transmissions require, and have been provided with in prior art devices, by-pass arrangements for limiting pump pressures. The present invention provides a by-pass construction designed to completely unload any of the pumps as they become unnecessary to operation of the transmission and, as a result, the several pumps continuously operate at a minimum load condition at all times. An important result of such minimal load operation is, of course, a reduction in heat generated by pressurization of the liquid of the hydraulic circulating system.

In modern hydraulic transmissions employing torque converters, the heat generated by the torque converter is very substantial. It is a well known fact that the mechanical efficiency of torque converters, particularly when operating in the high torque multiplication ranges, is low. The energy loss takes the form of heat energy and is transmitted to and accumulated in the hydraulic liquid of the transmission. This heat, coupled with the heat generated by the constantly loaded hydraulic circulating pumps provide an extremely high heat load. While it is, of course, possible to provide extra radiator cooling for the circulating oil of the transmission, such provisions are expensive. On the other hand, failure to provide such additional cooling in prior art transmissions has led, on occasion, to over-heating of the oil to the point where elastomeric seals commonly employed in the transmission deteriorate. Since it is imperative, in the design of the transmission initially, that the device be constructed such that it positively will not overheat, it is, of course, extremely important that operating temperatures be minimized. In the case of the present invention it has been found that operating temperatures are substantially lowered from those of previous transmission devices. Accordingly, external heat exchangers may be reduced in size, and in some cases, eliminated, in either of which case reductions in cost are made possible.

In accordance with the present invention, a dual pump is provided. This pump has sufficient capacity when both outputs are combined, to provide for all of the needs of the transmission, even at low speeds. Upon attainment of a speed that would normally by-pass a substantial portion of the pump output, in prior art designs, one of the outputs of the pump is dumped or completely relieved of pressure thereby discontinuing the application of energy to the transmission liquid by that portion of the pump. This, of course, prevents the addition of heat to the liquid when such heat is unnecessary and, as above noted, undesired.

Still further, in accordance with the present invention, the dual pump employed in the transmission of the present invention comprises a radial vane type pump in which both the outer and inner radial ends of the vanes act as pressurizing agents. As those skilled in automotive designs are aware, the pulses caused by the pumping action of rotary vane type pump blades creates a vibration which makes itself felt in driving the vehicle. These pulses are at the peak of pressurization by each blade. In accordance with the present invention harmonic vibrations are prevented, and it has been found that the noise level is very materially reduced over prior transmissions, by staggering the two pump outlets slightly on their peripheral dimensions so that the pressure peaks reached by the inner and outer pumping chambers are slightly separated. This provides two separate sets of pulses, each set having the same frequency, but with the sets being slightly out of phase.

It is, accordingly, an object of the present invention to provide an improved hydraulically controlled automatic transmission.

Another object of the invention is to provide an hydraulically controlled transmission having a substantially reduced internal heat build-up attributable to liquid moving pumps.

Still another object of the present invention is to provide an automatic transmission having a substantially reduced heat build up and at the same time having quiet operations.

Yet a further object of the present invention is to provide a dual radial vane pump and controls therefor permitting dumping of one or more outputs above a predetermined speed of operation and/or transmission oil pressure to thereby substantially eliminate energy input to the pump fluid above such speeds and/or pressures.

Still another object of the invention is to provide an inexpensive multiple output pump having a high pulse rate, the pulses of which are characterized by two sets of slightly out-of-phase pulses per pump revolution.

A feature of the invention resides in the provision of an improved regulator valve in combination with a simplified, relatively inexpenesive, multiple output pump for automatic transmissions or the like.

Still a further feature of the invention is the provision of a multiple output radial vane type pump having staggered pressure peaks to minimize the possibilities of vibrational resonance in the transmission system.

Still other and further objects and features of the present invention will at once become apparent to those skilled in the art from a consideration of the attached drawings wherein several embodiments of the present invention are shown by way of illustration only, and wherein:

FIGURE 1 is a diagrammatic illustration of a vehicular automatic transmission and control system therefor;

FIGURE 2 is a diagrammatic illustration of a portion of the hydraulic control circuit illustrated in FIGURE 1;

FIGURE 2a is a diagrammatic illustration of the governor control valve forming a part of the circuit shown in FIGURE 2;

FIGURE 3 comprises a modified form of control circuit constructed in accordance with the present invention;

FIGURE 4 is a diagrammatic illustration of the two-flow hydraulic transmission front pump employed in accordance with the present invention; and FIGURE 5 is a diagrammatic view of a further modification of the present invention.

As shown on the drawings:
The basic components of an hydraulically controlled automatic transmission constructed in accordance with the present invention are shown diagrammatically in FIGURE 1. There, the input drive shaft 10 drives the rotor 11 of a torque converter generally indicated at 12. The torque converter 12 is provided with a conventional stator 13 and output rotor element 14 drivingly connected to an output shaft 15. The output shaft drives a conventional planetary gear reduction unit 17 having an output shaft 18 drivingly rotating rear pump 19 and, similarly, drivingly rotating the transmission output or propeller shaft 20. A front hydraulic pump is conveniently located within the transmission housing, for example, as shown at 16, and is drivingly rotated by shaft 21 rotating with input shaft 10. The specific details of the transmission as such are not a part of the present invention and are illustrated diagrammatically merely for background purposes. The hydraulic controls do, however, comprise a novel and greatly improved transmission system as more fully set forth below.

As seen in FIGURE 1, pump 16 is connected to regulator valve 25 by way of conduits 26 and 27. Similarly, rear pump 19 is connected to regulator valve 25 by conduit 28 and manual push-to-start valve 29 selectively controlling flow to regulator valve 25 or governor valve 30. Flow from the regulator valve 25 is directed to the torque converter 12 via conduit 31 and, for control purposes, to the gear reduction transmission unit 17 via manual control valve 32 and conduits 33 and 34. The regulator valve 25 is ported to the transmission oil sump 35 by way of conduit 36. Similarly, the governor control valve 30 is ported to sump 35 via conduit 37.

The control and pumping components of the transmission are more readily seen from the showings of FIGURES 2 and 4. The front hydraulic pump 16 is specifically illustrated in FIGURE 4 while one form of hydraulic control circuit operable therewith is illustrated in FIGURE 2.

Referring first to FIGURE 4, the front hydraulic pump 16 is shown as comprising a rotor 40 mounted for rotation within a bore 41 in a fixed housing 42. The rotor is mounted eccentrically relative to the bore in the manner of vane type rotary pumps, the arrangement being such that the rotor is concentric about axis 43 which is slightly displaced from the bore axis 44. The rotor is provided with a plurality, in the present case 7, of slipper or vane members 45 radially slidable in respective slots 46 and normally biased radially outwardly by springs 47 as well as centrifugal force. In the pump illustrated, the slippers 45 operate at their outer peripheries as vanes and at their inner ends as pumping pistons in the manner more specifically set forth and claimed in our copending application for United States Serial No. 814,516 filed May 20, 1959, now abandoned, now merged with Serial No. 27,622 filed May 9, 1960 and issued as U.S. Patent No. 3,081,706 dated March 19, 1963.

As in the pump illustrated in that copending application, the pump illustrated in FIGURE 4 of the drawings operates to pump hydraulic liquid from outer pump inlet 50 and inner pump inlet 51 to outer pump outlet 52 and inner pump outlet 53 respectively as in the pump illustrated in said copending application, the individual slippers 45 carry axially extending check valve rods 54 which operate as check valves permitting flow from the outer pump outlet to the inner pump outlet but not vice versa. As above noted, the specific construction of the pump as thus far described is similar in operation to the pump set forth in our copending application. The pump of the present invention operatively differs from the pump illustrated and claimed in that copending application, however, in providing a staggered pumping action.

It will be observed from a consideration of FIGURE 4 that the trailing ends 52a and 53a of the outer pump outlet 52 and inner pump outlet 53 respectively end approximately on the same radial line. The pumping action of the slippers 45, however, operates differently with respect to the inner and outer outlet. Thus, relative to the outer pump outlet the individual slippers 45 provide a maximum pressure peak at the instant when the forward edge of the slipper passes the edge 52a of the outer pump outlet. On the other hand, relative to the inner pump outlet, the maximum pressure peak is achieved when the trailing corner 45b passes the end 53a and the piston pumping action is cut off. Since, in the arrangement shown, the peak pressure in the outer pump outlet has achieved approximately a slipper's width prior to achievement of maximum pump pressure in the inner pump outlet, the pressure peaks of the combined pumping system are staggered in two steps of seven pulses per revolution. By thus staggering the pulses, the resonance of the system, or possible tuning of the system to the resonant frequency of other transmission components, may be prevented. It is, of course, manifest that the pump may be varied in its tuning by precisely controlling the position of the trailing edge 52a of the outer pump outlet and/or the width of the individual slippers 45.

The functioning of the pump illustrated in FIGURE 4, in the automatic transmission control system may more readily be observed from a consideration of FIGURE 2. As there illustrated, the regulator valve generally indicated at 25, comprises a reciprocal valve core 60 slidable within a fixed housing 61 and biased in the downward direction against bore end 62 by a spring 63. In the embodiment illustrated, the valve core is provided with lands 64, 65 and 66 providing a pair of control chambers 67 and 68.

In the arrangement shown in FIGURE 2, pump 16 has the outer output 52 connected to chamber 68 by way check valve 69 and the inner outlet 53 connected to chamber 68 by way of check valve 70 and conduit 27. Chamber 67 is likewise connected to the outer pump outlet 52 by way of conduit 26 and, similarly, is connected to the low pressure sump 35 by way of conduit 31 and to manual control valve, or transmission shifting valve 32 by way of conduit 33. Conventional rear pump, which may be of any standard form, either gear or vane type, indicated at 19, provides a rear pump output via conduit 28 to line 33 via check valve 71 and manual push-to-start valve 29. The valve 29 comprises, as shown, a valve core 72 slidably mounted in a housing 73 and in the position illustrated directs all of the output of the rear pump to a governor sensing valve 30 by way of conduit 29a. Upon manual shifting of the valve into position against the end 74 of the housing portion 73, conduit 28 is connected to line 33 by way of check valve 71 and conduit 29a is cut off from the rear pump.

In the starting position of ordinary operations when the engine is stopped, the valve core 60 is positioned in its lowermost position against the end 62 of the bore 61. In this position line 31 to the converter is blocked by land 65, thereby preventing flow from the converter through the valve. Similarly, sump 36 is disconnected from line 26 by land 64. Upon starting the engine, the pump 16, which rotates therewith, generates hydraulic pressure at both outlets 52 and 53. This pressure is directed to chamber 68 and, further, is placed behind land 66, by orifice 75 directed to chamber 76. Since land 66 has a greater diameter than core portion 77, the pressure in 76, damped by orifice 75, provides a biasing force in the upward direction against spring 63 causing the valve core to move upwardly and directing fluid from chamber 68 to the converter via conduit 31 and to the manual control valve via conduit 33.

During initial relatively slow speeds of operation, the pressure in chamber 76 is sufficient only to open fluid to the converter via conduit 31 and is insufficient to open chamber 67 to connect conduits 26 and 36. Accordingly, the pressures of both outlets 52 and 53 are applied to chamber 68 and the total volume from the pump under these circumstances is available for converter use and for control purposes in shifting the brakes and clutches of the transmissions to accomplish various gear ratios.

While in conventional transmissions the output of the transmission control pump corresponding to the pump 16 of the present invention is by-passed through a relief valve upon increase of engine speed beyond a predetermined level, such pumps in the past have always operated to pressurize all of the fluid and merely by-pass a portion of the thus pressurized fluid back to the sump. In accordance with the present invention, however, upon an increase of engine speed and pressure, the valve core 60 moves upwardly in sufficient amount to connect conduits 26 and 36 via chamber 67. This dumps the entire output of the pump outlet 52 to sump 35 at substantially no pressure. Accordingly, the liquid moved by the outer portion of the pump assumes relatively little heat. It is noted that under such circumstances of operation, the check valve 69 and check valve pins 54 in the pump itself permits pressure to build up at the inner pump outlet without regard to the susbtantial elimination of pressure in conduit 26. If in any instance the pressure in chamber 68 becomes greater than necessary to the operation of the transmission, such as for example at high speeds, the pressure in chamber 76 will force the valve core 60 still further upward cracking chamber 68 to sump 36 and by-passing a small part of the output of the outlet 53 back to sump 35 in the normal by-pass manner.

Automatic shifting of the mechanical transmission component 17 requires a speed-responsive control ordinarily supplied in the form of a speed-responsive governor sensing the speed of rotation of the output or propeller shaft 20. In the present instance, a linear governor response is provided in an hydraulic form. This is shown in FIGURES 2 and 2a. There, the rear pump 30 which is driven from the propeller shaft 20 is normally positioned to supply its output to governor valve 30. The valve 30 comprises a reciprocal valve core 80 biased by spring 81 over a keyhole shaped orifice 82. Pressure is directed from conduit 29a to a control governor of any conventional form, not shown, by way of conduit 30a which is always open to conduit 29a. Pressure is maintained in conduit 29a and conduit 30a by the blocking action of core 80 over slot 82. Upon continuing increase in pressure in conduit 29a, resulting from an increase in speed of output shaft 20, the core 80 is moved toward the left against spring 81 gradually opening slot 82 to sump 36. By providing a keyhole shaped slot with enlarged end 82a, as illustrated especially in FIGURE 2a, operation of the device at high output pressures will be at the enlarged end, providing an effective limit to the pressure sent to the governor. This limit is desirable in preventing overpressurization of the governor and occurs only above the normal governor operating range. The straight portion of the slot 82 provides a linear governor response over the normal range of transmission operation. Utilization of an ordinary fixed round orifice would, on the other hand, provide an unsatisfactory curve. Since governor controls are preferably based on a straight-line relationship, the keyhole shaped slot 82 provides the most satisfactory, straight-line relationship desired in the normal range, and provides a preferred governor embodiment with overload relief.

In normal operation of the vehicle, during which time it is desired that the automatic transmission shift in accordance with varying speed conditions, the push-to-start valve 29 is in the position shown in FIGURE 2 and, accordingly, the governor connection 30a will provide a straight-line accurate shifting control. On the other hand, during emergency situations in which it is necessary to push the vehicle in order to start the engine, it is not essential that the transmission shift speeds until after the engine is started. Accordingly, the valve 29 is moved into the down position in which conduit 28 connects pump 30 to the conduit 33 and chamber 68 via which fluid under pressure is fed to the converter 31 and control valve 32 in order to provide a drive connection through the transmission. It is noted that during this push-to-start condition, liquid under pressure fed to chamber 68 will, as in the ordinary situation, bleed into chamber 76 via orifice 75 to cause movement of the valve core 60 to uncover the converter port 31. Similarly, during such start conditions, check valves 69 and 70 will be closed permitting flow pressure build up. As soon as the engine has been successfully started as a result of the application of torque thereto by way of transmission, the valve 29 may be shifted to the position shown in FIGURE 2 during which condition the standard automatic operation will occur.

In the somewhat modified form of the invention illustrated in FIGURE 3, rear pump 30 is connected to chamber 68 via conduit 33 at all times by way of check valve 71 and conduit 28. As a result of this arrangement the vehicle may be started by pushing without the requirement of a manual valve such as valve 29 illustrated in FIGURE 2. On the other hand, the special governor control shown in FIGURE 2 may be dispensed with and the system, as thus modified, is particularly adapted to automatic transmissions of the torque converter type in which a plurality of converter rotors are provided and in which no mechanical transmission shifting is provided, the torque converter automatically operating to provide a full range of vehicle speeds. Under such circumstances it is desirable that all of the output of the front pump, both outer and inner stages, be dumped to the sump 35 as soon as a sufficient pressure is built up by the rear transmission pump to maintain the pressure in chamber 68 at its desired level. Accordingly, valve core 160 is provided with an extra reduced portion 90 forming chamber 91 by way of which the inner pump via chamber 91 through conduit 27a when valve land 92 is moved upwardly, by build up of pressure in chamber 68 and chamber 76 sufficient to uncover port 93. As pointed out above, the pressure in chamber 68 may readily be built up to a sufficient pressure to maintain the transmission in operation as soon as the vehicle reaches a modest operating speed. Of course, upon reduction of vehicle speed below such a point, the pressure in chamber 68 will drop, valve core 160 will move downwardly to close off dumping chambers 67 and 91 at which point the outputs of both inner and outer pumping chambers 52 and 53 will be applied to the converter chamber 68. As shown, in operation, outer pump outlet 52 is dumped before outlet 53 is dumped as the valve core 160 moves upwardly under the influence of pressure in chamber 76. With this arrangement, the maximum amount of liquid will be dumped, and a minimum amount of heat load will be applied to the hydraulic liquid throughout the various speed ranges of vehicle operation.

It has been found that in vehicular transmission operation that actual dumping of one of the outlets of the front pump 16 will drop the transmission operating temperature on the order of 25° Fahrenheit and, simultaneously, will reduce the horsepower required to drive the pump 16. These improvements in operating efficiency are very important, particularly where, as pointed out above, the transmission is to be air-cooled rather than provided with a separate expensive radiator and transfer unit. It has been found that in practice a transmission employing the system above described, may satisfactorily employ air cooling thereby substantially reducing the cost of the automatic transmission installation.

It will thus be seen that we have provided an improved transmission control system. It will be apparent, further, that variations and modifications may be made in the system without departing from the scope of the novel concepts of the present invention. For example, it will be apparent that the rear vehicle pump may be dispensed with entirely where the push-to-start feature is not deemed worth the expense. In such a case, conduit 33 shown in FIGURE 2 is directly connected to the manual control valve without provision for conduit 28, rear pump 30, or governor valve 80. Similarly, with special reference to the embodiment shown in FIGURE 3, the rear pump may comprise a two-stage pump, one stage of which is connected to chamber 68 via conduit 33 in the manner illustrated in FIGURE 3 and the other chamber of which may be connected to a governor valve such as valve 80 shown in FIGURE 2. This arrangement would prove desirable when the control system is provided for an automatic transmission employing a mechanical shift, the operation of which requires a drive shaft speed responsive control.

It may be understood that in accordance with the present invention the two portions 52 and 53 of the main pump 16 need not be by-passed by a single regulating valve. In some transmission installations it will be desirable that a separate valve be provided to dump the outer portion, separate from the control valve acting on the inner portion, so that the separate valve controlling the outer portion may be integrated into the pump assembly, thereby permitting the advantages of the operation of the present invention to be applied to other forms of transmissions presently having a control valve influencing only a single pump outlet. Such an arrangement is shown, for example, in FIGURE 5 wherein the component parts are numbered the same as in previous FIGURE 3, where identical thereto. As shown in FIGURE 5 separate valve 25a is provided. Core 162 thereof is reciprocably mounted therein under the influence of spring 163 and the pressure in control line 27 at chamber 164. It will be evident that, as in the case of the structure illustrated in FIGURE 3, as the pressure in conduit 27 increases, the valve core 162 will move against spring 163 and at a predetermined point will connect conduits 26 and 36 to dump the output of outer pump 52 to sump 35 in the same manner as illustrated in FIGURE 3 wherein the upper flange 67 accomplishes the same result.

Still other and further variations may be made without departing from the invention and it is, accordingly, our intention that the scope of the present invention be limited solely by that of the hereinafter appended claims.

We claim as our invention:

1. In combination in an automotive transmission having an input drive shaft, an output shaft, and an hydraulic torque converter connecting said shafts for the variable ratio transmission of power, an hydraulic control system comprising a first dual-stage hydraulic pump driven by said input drive shaft providing first and second separate pressurized outputs at first and second outlets respectively, a regulator valve, means connecting the first output of said pump to an inlet to said regulator valve, means connecting the second output of said pump to said valve inlet, one-way check valve means connecting said second outlet to said first outlet and permitting flow only from said first to said second outlet, means responsive to the pressure in said valve inlet to move said valve to a position connecting said inlet with said converter to supply fluid under pressure from said inlet to said converter, said last-named means operating upon a predetermined increase in fluid pressure in said inlet above a designated pressure to move said valve to direct the output of said first outlet to a low pressure reservoir supplying said pump with fluid to be pressurized and distributed, the direction of said fluid to said reservoir operating by virtue of said valve to remove substantially all of the load from the fluid at said first outlet, said last-named means operating upon a further increase in fluid pressure in said inlet to move said valve to direct the output of both said first and second outlets to said low pressure reservoir while removing substantially all of the load from the fluid at said outlets thereby substantially eliminating the energy applied to said fluid by said pump upon said further increase in fluid pressure, and a second hydraulic pump driven by said output shaft and having the output thereof connected to said valve inlet.

2. In combination in an automotive transmission having an input drive shaft, an output shaft, and an hydraulic torque converter connecting said shafts for the variable ratio transmission of power, an hydraulic control system comprising a first dual-stage hydraulic pump driven by said input drive shaft providing first and second separate pressurized outputs at first and second outlets respectively, a regulator valve, means connecting the first output of said pump to an inlet to said regulator valve, means connecting the second output of said pump to said valve inlet, one-way check valve means connecting said second outlet to said first outlet and permitting flow only from said first to said second outlet, means responsive to the pressure in said valve inlet to move said valve to a position connecting said inlet with said converter to supply fluid under pressure from said inlet to said converter, said last-named means operating upon a predetermined increase in fluid pressure in said inlet above a designated pressure to move said valve to direct the output of said first outlet to a low pressure reservoir supplying said pump with fluid to be pressurized and distributed, the direction of said fluid to said reservoir operating by virtue of said valve to remove substantially all of the load from the fluid at said first outlet, said last-named means operating upon a further increase in fluid pressure in said inlet to move said valve to direct the output of both said first and second outlets to said low pressure reservoir while removing substantially all of the load from the fluid at said outlets thereby substantially eliminating the energy applied to said fluid by said pump upon said further increase in fluid pressure, a second hydraulic pump driven by said output shaft and having an output conduit, and manual valve means selectively connecting the output of said second hydraulic pump to said valve inlet or to governor means controlling gear reduction means connected between said torque converter and said output shaft.

3. In combination in automotive transmission having an input drive shaft, an output shaft, and an hydraulic torque converter connecting said shafts for the variable ratio transmission of power, an hydraulic control system comprising a first dual-stage hydraulic pump driven by said input drive shaft providing first and second separate pressurized outputs at first and second outlets respectively, a regulator valve, means connecting the first output of said pump to an inlet to said regulator valve, means connecting the second output of said pump to said valve inlet, one-way check valve means connecting said second outlet to said first outlet and permitting flow only from said first to said second outlet, means responsive to the pressure in said valve inlet to move said valve to a position connecting said inlet with said converter to supply fluid under pressure from said inlet to said converter, said last-named means operating upon a predetermined increase in fluid pressure in said inlet above a designated pressure to move said valve to direct the output of said first outlet to a low pressure reservoir supplying said pump with fluid to be pressurized and distributed, the direction of said fluid to said reservoir operating by virtue of said valve to remove substantially all of the load from the fluid at said first outlet, whereby the energy supplied to said fluid by said pump is substantially reduced upon attainment of said predetermined increase in fluid pressure, a second hydraulic pump driven by said output shaft and having an output conduit, and manual valve means selectively connecting the output of said second hydraulic pump to said valve inlet or to governor means controlling gear reduction means connected between said torque converter and said output shaft.

(References on following page)

References Cited by the Examiner

UNITED STATES PATENTS

| | | | |
|---|---|---|---|
| 2,688,924 | 9/54 | Lisks | 103—4 |
| 2,764,941 | 10/56 | Miller et al. | 103—4 |
| 2,815,684 | 12/57 | Roche | 74—645 |
| 2,875,643 | 3/59 | Kelley | 74—645 |
| 2,932,990 | 4/60 | Cartwright et al. | 74—763 |
| 2,957,419 | 10/60 | Michel | 103—11 |
| 2,993,445 | 7/61 | Ostwald | 103—11 |

DON A. WAITE, *Primary Examiner.*

BROUGHTON G. DURHAM, *Examiner.*